April 6, 1926.
G. J. VAROUTSOS
VEHICLE SIGNAL
Filed Oct. 21, 1924
1,579,977
3 Sheets-Sheet 1
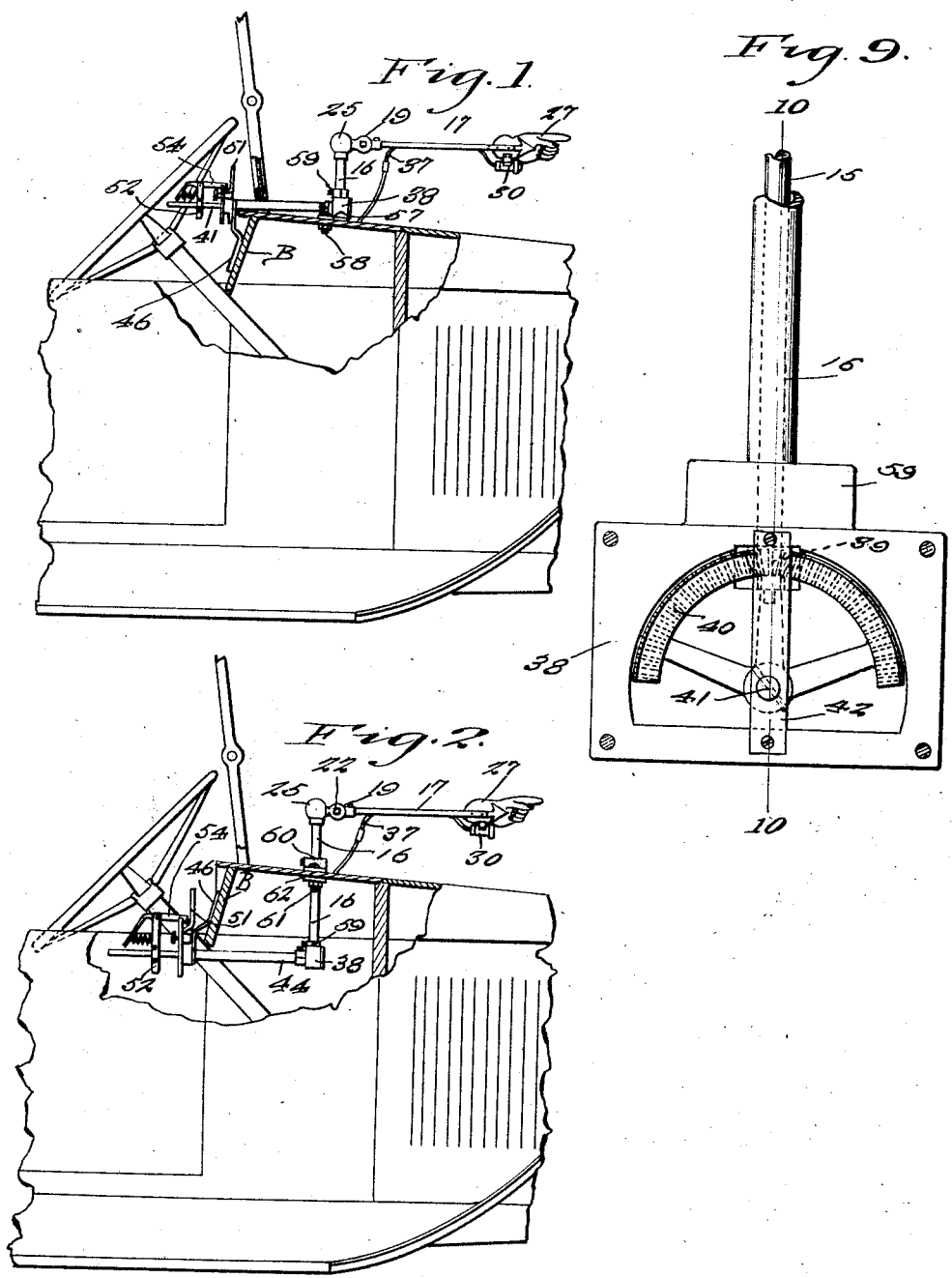

April 6, 1926.
G. J. VAROUTSOS
VEHICLE SIGNAL
Filed Oct. 21, 1924
1,579,977
3 Sheets-Sheet 2
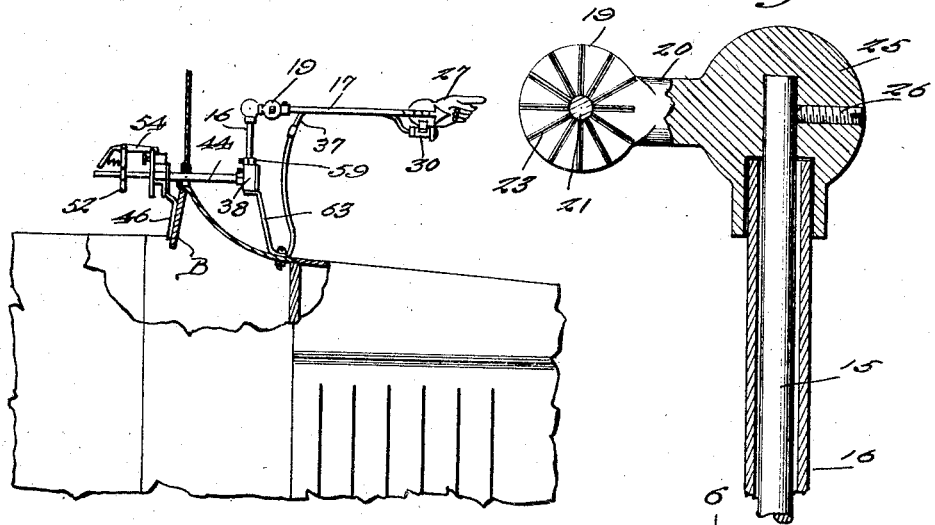
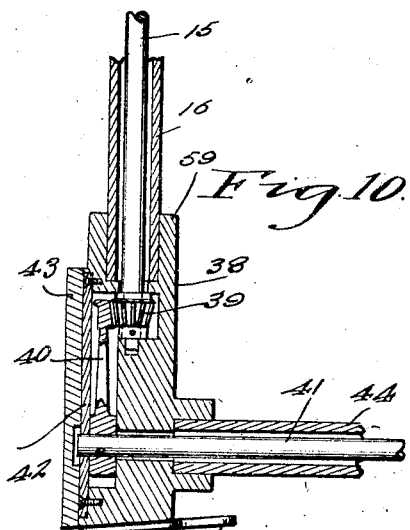
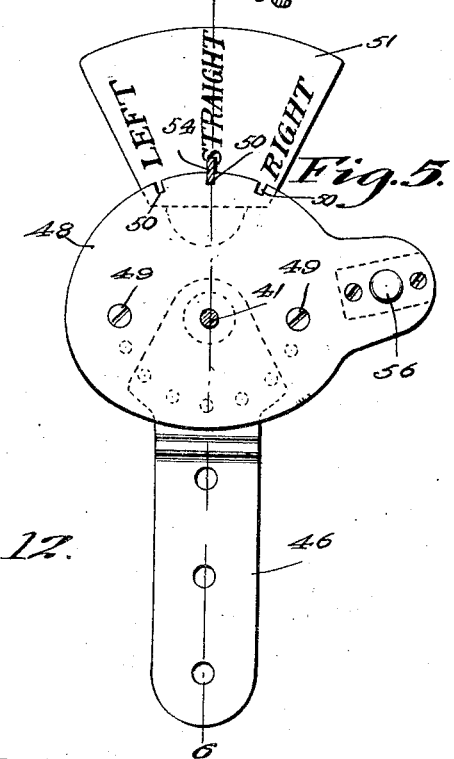
G. J. Varoutsos
INVENTOR
BY Victor J. Evans
ATTORNEY April 6, 1926.
G. J. VAROUTSOS
1,579,977
VEHICLE SIGNAL
Filed Oct. 21, 1924    3 Sheets-Sheet 3
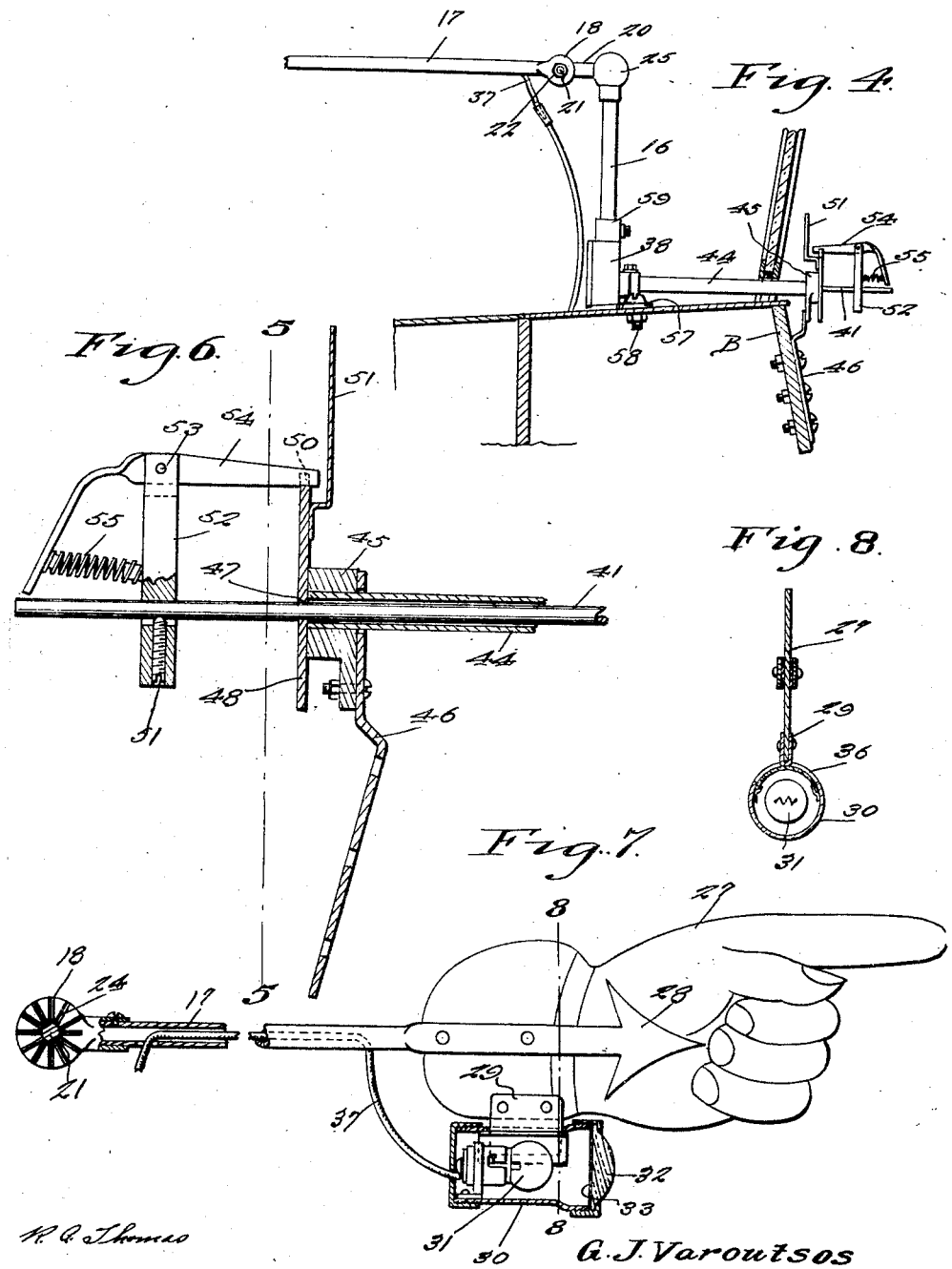
G. J. Varoutsos
INVENTOR
BY Victor J. Evans
ATTORNEY
WITNESS:

Patented Apr. 6, 1926.

1,579,977

UNITED STATES PATENT OFFICE.

GEORGE J. VAROUTSOS, OF LOWELL, MASSACHUSETTS.

VEHICLE SIGNAL.

Application filed October 21, 1924. Serial No. 744,993.

*To all whom it may concern:*

Be it known that I, GEORGE J. VAROUTSOS, a citizen of the United States, residing at Lowell, in the county of Middlesex and State of Massachusetts, have invented new and useful Improvements in Vehicle Signals, of which the following is a specification.

This invention relates to improvements in direction signals for automobiles, an object being to provide a signal which may be mounted upon the cowl or other conspicuous part of an automobile so as to readily attract attention both day and night, and be conveniently operated to plainly indicate proposed change in direction of travel, the character of the signal and its position being such that it may be seen both from the front and rear of the automobile.

With the above and other objects in view, the invention further includes the following novel features and details of construction, to be hereinafter more fully described, illustrated in the accompanying drawings and pointed out in the appended claim.

In the drawings:—

Figure 1 is a fragmentary elevation partly in section illustrating the invention in position for use.

Figure 2 is a similar view showing a different manner of mounting the signal.

Figure 3 is a like view showing another means for mounting the signal.

Figure 4 is an enlarged fragmentary sectional view showing the signal mounted as illustrated in Figure 1.

Figure 5 is a view taken substantially on the line 5—5 of Figure 6.

Figure 6 is a section taken substantially on the line 6—6 of Figure 5.

Figure 7 is an enlarged fragmentary sectional view of the signal arm and the signal device carried thereby.

Figure 8 is a section on the line 8—8 of Figure 7.

Figure 9 is a fragmentary elevation illustrating the connection between the vertical and horizontal shafts with the cover plate of the gear housing removed.

Figure 10 is a section on the line 10—10 of Figure 9.

Figure 11 is a fragmentary section illustrating the connection between the vertical shaft and the horizontal signal arm.

Figure 12 is a detail elevation of the colored disk for the signal lamp.

Referring to the drawings in detail whereïn like characters of reference denote corresponding parts, the invention as shown comprises a vertically disposed shaft 15 which is of suitable length and which is mounted within a tubular casing or sleeve 16. The upper end of the shaft 15 supports a horizontally disposed signal arm 17 and the inner end of this arm carries a disk 18 which is pivotally and adjustably secured to a similar disk 19 at the outer end of a short arm 20. A stud 21 extends through the disks 18 and 19 and these disks are held against accidental movement by a clamping nut 22 and ribs and grooves 23 and 24 respectively provided upon the opposed faces of the disks 18 and 19. The inner end of the short arm 20 carries a socketed member 25 which receives the upper end of the shaft 15 and which engages over the upper end of the sleeve 16, a set screw 26 serving to hold the short arm 20 connected to the shaft.

The arm 17 is hollow and secured to its outer end is a hand or indicator 27 which may be suitably colored and which may have secured to its opposite sides pointers or arrows 28, the latter being also suitably colored. Secured to this hand or indicator 27 by means of a bracket 29 is a lamp housing 30, an electric lamp 31 being secured within the housing. This housing is provided at its forward end with a lens 32 which is backed by a transparent disk 33 and this disk is preferably provided with a red center 34 and a green annular margin 35, so that when the lamp is lighted the signal will readily attract attention. The casing 30 is provided with a transparent portion 36 which extends upon opposite sides of the hand or indicator 27 so that light from the lamp 31 in addition to being projected forward through the lens 32 will be projected upward so as to illuminate the signal device. An electric cable 37 extends rearwardly through the arm 17 to within convenient reach of the driver of a vehicle, as will be hereinafter explained.

The sleeve 16 extends downwardly within a housing 38 and the shaft 15 has secured upon its lower end a beveled pinion 39. This pinion is engaged by a segmental gear 40 which is mounted upon one end of a horizontally disposed shaft 41. This shaft extends through the gear housing 38 and has a bearing in a plate or bar 42 which is removably secured in place, while a cover plate 43 serves to conceal the pinion 39 and the gear 40.

The shaft 41 is enclosed within a tubular housing or sleeve 44, one end of which is mounted in the gear housing 38 while the opposite end extends rearwardly preferably beneath the instrument board of the automobile and is mounted in a block 45 which is carried by a bracket or arm 46. This bracket or arm 46 is secured to the instrument board B of the automobile and serves to support the inner end of the sleeve 44.

The shaft 41 extends rearwardly beyond the inner end of the sleeve and through an opening 47 provided in a plate 48, the latter being secured to the block 45 by means of screws 49. The plate 48 is thus held rigid with respect to the shaft 41 and provides a bearing for the latter. The plate 48 is provided with spaced notches 50 and carries an indicator plate 51 having the words "Left", "Right", and "Straight", opposite the notches. Secured upon the inner end of the shaft 41 as indicated at 51 is an arm 52, the upper end of this arm having pivotally secured thereto as shown at 53, a latch 54. This latch is adapted to engage in the notches 50 and be yieldingly held in such engagement by means of a spring 55. The arm 52 thus provides a support for the latch 54 and in addition provides a handle or grip by means of which the shaft 41 may be conveniently rotated.

In addition, the plate 48 carries a push and pull switch 56 to which the electric cable 37 is suitably connected so that the lamp 31 may be controlled.

By grasping the arm 52 at the inner end of the shaft 41, the end of the latch 54 to which the spring 55 is connected may be pressed inward so that the latch will be disengaged from the plate 48, whereupon the shaft 41 may be rotated to operate the signal. Rotation of the shaft to the right will swing the signal arm to the right to indicate a right turn, while rotation of the shaft to the left will swing the signal arm to the left to indicate a left turn. The length of the signal arm is such that the signal device may be seen from the rear as well as from the front of the automobile, while the connection between the arm 17 and the short arm 20 permits of vertical adjustment of the signal device. As shown in Figure 1, 2 and 3 of the drawings, the signal may be secured in different positions. In Figure 1 the signal is shown as mounted upon the outside of the cowl of the automobile with the horizontally disposed shaft 41 and sleeve 44 extending rearwardly from the top of the cowl and through a notch provided in the windshield frame. For this purpose the gear housing has detachably secured to its bottom, spaced apertured ears 57 which are bolted or otherwise secured to the cowl as shown at 58. A split clamp 59 serves to secure the sleeve 16 to the top of the gear housing 38.

In Figure 2 the shaft 15 and sleeve 16 extend downwardly through an opening provided in the cowl. The sleeve 16 has secured thereto a clamp 60 which rests upon the top of the cowl, while bolts 61 which extend through this clamp and through the cowl, also extend through a plate 62 which engages the under face of the cowl so that the sleeve will be securely clamped in place. The shaft 41 and its sleeve 44 extend beneath the instrument board and the bracket 46 is secured to the instrument board in a reverse position from that shown in Figure 1.

In Figure 3 of the drawings, the shaft 41 and the sleeve 44 extend through a notch or opening provided in the frame of the windshield and as the automobile shown in this figure is provided with a downwardly curved or disked cowl, the apertured brackets 59 are removed from the gear housing and relatively long bracket arms 63 are substituted therefor.

The invention is susceptible of various changes in its form, proportions and minor details of construction and the right is herein reserved to make such changes as properly fall within the scope of the appended claim.

Having described the invention what is claimed is:—

A signal operating means, an operating shaft therefor, a rigid plate having an opening therein for the passage of the operating shaft and forming a bearing for one end of the latter, an arm attached to the shaft midway between the plate and the inner end of the shaft and extending at right angles to said shaft, said plate having spaced notches in its outer edge, a latch member of angular formation having one arm pivotally connected to the outer end of the arm on the operating shaft with one end adapted to engage any one of said notches, the other arm of the angular member being spaced from the arm on the operating shaft and a coil spring between the arm on the operating shaft and the second arm of the angular member whereby to normally retain the first arm of the angular member in engagement with any of said notches.

In testimony whereof I affix my signature.

GEORGE J. VAROUTSOS.